(12) United States Patent
Nolan (10) Patent No.: US 6,765,660 B2
(45) Date of Patent: Jul. 20, 2004

(54) SYSTEM AND METHOD FOR MEASURING THE QUALITY OF AN ILLUMINATION FIELD FROM A LASER LINE ILLUMINATION SYSTEM

(75) Inventor: John F. Nolan, Haverhill, MA (US)

(73) Assignee: Agfa Corporation, Wilmington, MA (US)

(*) Notice: Subject to any disclaimer, the term of this patent is extended or adjusted under 35 U.S.C. 154(b) by 0 days.

(21) Appl. No.: 10/424,026

(22) Filed: Apr. 28, 2003

(65) Prior Publication Data

US 2003/0202173 A1 Oct. 30, 2003

Related U.S. Application Data

(62) Division of application No. 09/854,612, filed on May 14, 2001, now Pat. No. 6,618,131.

(51) Int. Cl.[7] .................................................. G01J 1/00
(52) U.S. Cl. ...................................... 356/121; 356/122
(58) Field of Search ................................ 356/121, 122, 356/123; 359/738, 739, 740

(56) References Cited

U.S. PATENT DOCUMENTS 4,828,384 A * 5/1989 Plankenhorn et al. ....... 356/121
5,078,491 A * 1/1992 Johnston, Jr. ................ 356/121
5,459,565 A   10/1995 Aharon ....................... 356/121

FOREIGN PATENT DOCUMENTS

| EP | 0319345 | 6/1989 |
| FR | 811143 | 4/1937 |
| FR | 2663738 | 12/1991 |

* cited by examiner

Primary Examiner—Jordan M. Schwartz
(74) Attorney, Agent, or Firm—William E. Hilton; Robert A. Sabourin (57) ABSTRACT

A system is disclosed for analyzing an illumination field of a line of laser illumination. The system includes a first movable unit, a second movable unit, and a sensor unit. The first movable unit includes a first opening through which at least a portion of the illumination field may pass. The first movable unit is adapted for movement in a first direction. The sensor unit is adapted to receive illumination and to produce a sensor output signal representative a characteristic of the illumination field. The second movable unit includes a second opening through which at least a portion of the illumination field may pass. The second movable unit is positioned between the first movable unit and the sensor unit and is adapted for movement between at least a first position in which very little or no light from the illumination field may reach the sensor unit, and a second position in which a relatively high amount of light from the illumination field may reach the sensor unit.

21 Claims, 8 Drawing Sheets

SYSTEM AND METHOD FOR MEASURING THE QUALITY OF AN ILLUMINATION FIELD FROM A LASER LINE ILLUMINATION SYSTEM

The present application is a divisional application of U.S. Ser. No. 09/854,612 filed May 14, 2001, which issued on Sep. 9, 2003 as U.S. Pat. No. 6,618,131.

BACKGROUND OF THE INVENTION

The invention generally relates to the field of laser line illuminators, and specifically relates to systems and methods for measuring the quality of an illumination field from a laser line illumination system.

Laser line illumination systems generally employ an array of light sources, such as light emitting diodes, coupled with optics that produce a laser illumination field in the shape of a line. The optics may include a variety of optical elements including, for example, lenses, micro-lenses, and mirrors, as well as fiber optic cables.

Such systems may be used for a numerous applications, such as in imaging systems in which the laser line illumination field is directed toward a light modulator that modulates the illumination field by either selectively reflecting or transmitting specified portions of the illumination field. The modulated illumination field is then directed toward an imaging surface in which a portion of imageable media is selectively imaged. Either the illumination field or the imageable surface (such as a drum) is then moved with respect to other so that further portions of the imageable media may then be successively imaged.

Non-uniformities in the illumination field of a laser line illumination system may result in significant imaging inconsistencies that may be difficult to detect or correct. It is desirable that such laser line illumination systems produce an illumination field that has a uniform width throughout the length of the illumination line. It is also desirable that such systems produce an illumination field that has a uniform peak power throughout the illumination line. It is further desirable that such systems produce an illumination field that has a uniform power distribution throughout the length of the illumination line. It is further desirable that such systems produce an illumination field that has a uniform spot size throughout the length of the illumination line.

There is a need therefore, for a system and method of measuring the output characteristics of a laser line illumination system.

SUMMARY OF THE INVENTION

The invention provides a system for analyzing an illumination field of a line of laser illumination. The system includes a first movable unit, a second movable unit, and a sensor unit. The first movable unit includes a first opening through which at least a portion of the illumination field may pass. The first movable unit is adapted for movement in a first direction. The sensor unit is adapted to receive illumination and to produce a sensor output signal representative a characteristic of the illumination field. The second movable unit includes a second opening through which at least a portion of the illumination field may pass. The second movable unit is positioned between the first movable unit and the sensor unit and is adapted for movement between at least a first position in which very little or no light from the illumination field may reach the sensor unit, and a second position in which a relatively high amount of light from the illumination field may reach the sensor unit.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 1:
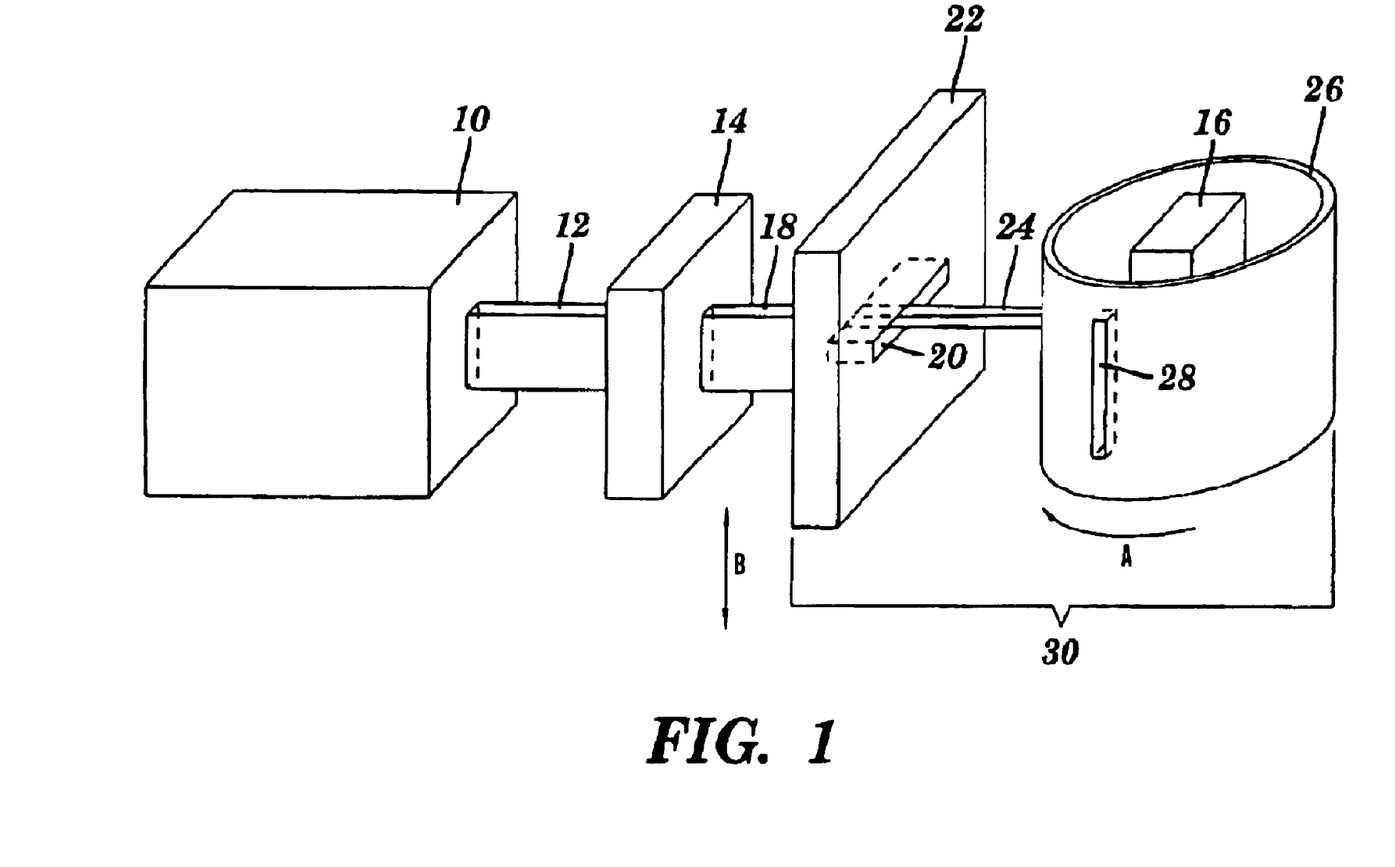
FIG. 1 shows an illustrative view of an illumination field measurement system in accordance with an embodiment of the invention.
Figure 2:
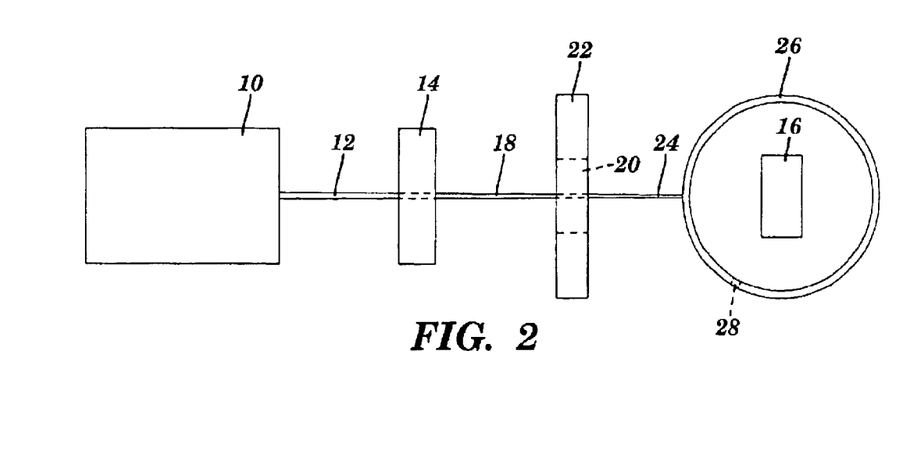
FIG. 2 shows an illustrative top view of the system of FIG. 1.
Figure 3:
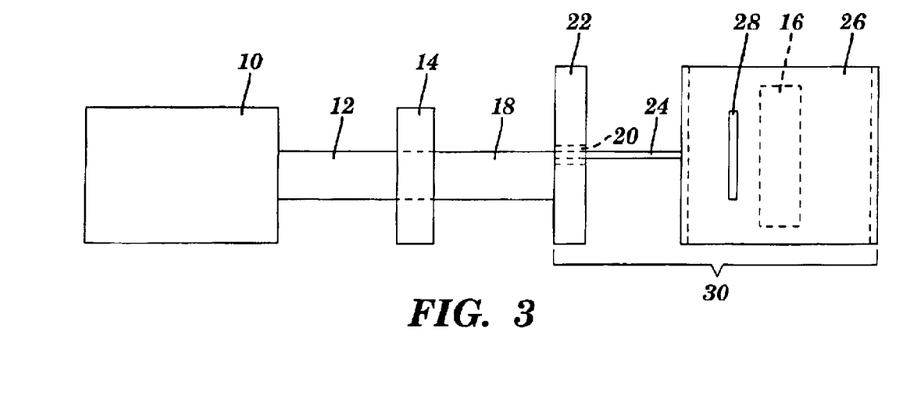
FIG. 3 shows an illustrative side view of the system of FIG. 1.

As shown in FIGS. 1–3, a system in accordance with an embodiment of the invention maybe used with laser system 10 that produces a line of laser illumination 12. In various embodiments, the laser system 10 may include a variety of optical devices such as micro-lenses and fiber optic cables. The line of laser illumination 12 is then transmitted through a filter 14 such as a mirror, e.g., a 99% reflecting mirror, to reduce the amount of light that is received by the sensor unit 16. The filtered line of laser illumination 18 is then passed through an aperture 20 in an aperture unit 22. A portion 24 of the illumination is then received by a rotating slit unit 26 that includes a slit opening 28 is its outer wall.

The rotating slit unit 26 is adapted to rotate as indicated at "A", and the combined assembly 30 of the aperture unit 22 and the rotating slit unit 26 is adapted to travel up and down with respect to the laser illumination system as indicated at "B". The laser line of illumination may, for example, be 75 microns by 18 mm. The aperture 20 may have a width of 150 um (microns) and a length of 3 mm. The slit 28 may have a width of 1 micron and a length of 3 mm. In an embodiment, the aperture 20 is oriented orthogonal to the orientation of the illumination line and is positioned to be at or near the focal plane of the illumination line. The slit 28 is positioned to be orthogonal to the aperture 20 and parallel with the orientation of the illumination line.

Figure 4:
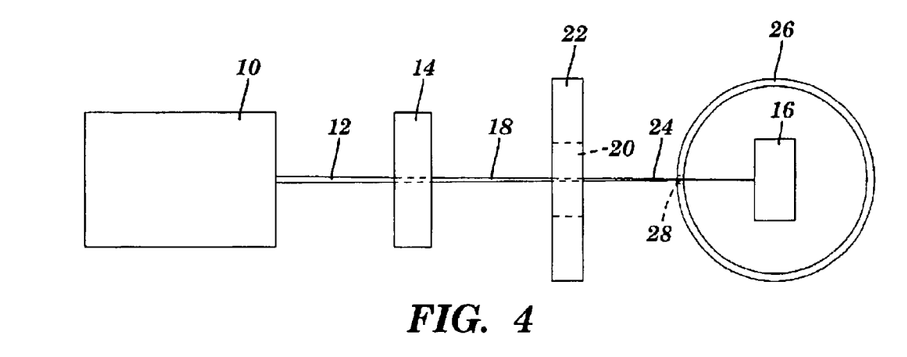
FIG. 4 shows an illustrative top view of the system of FIG. 1 with the slit unit rotated such that the slit is aligned with the illumination field.
Figure 5:
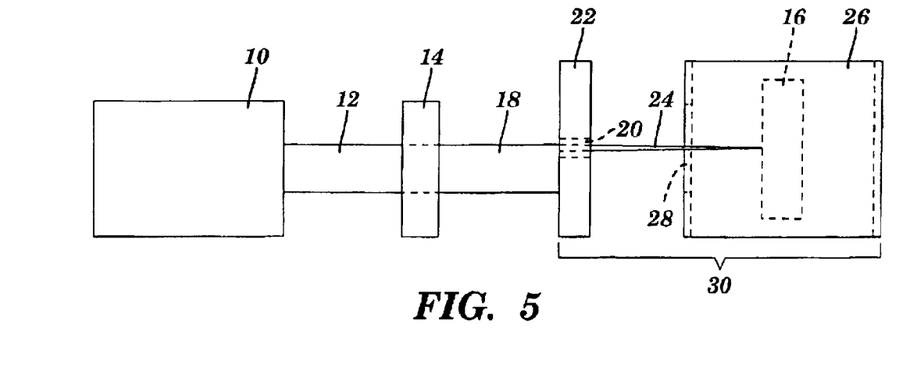
FIG. 5 shows an illustrative side view of the system shown in FIG. 4.
Figure 6:
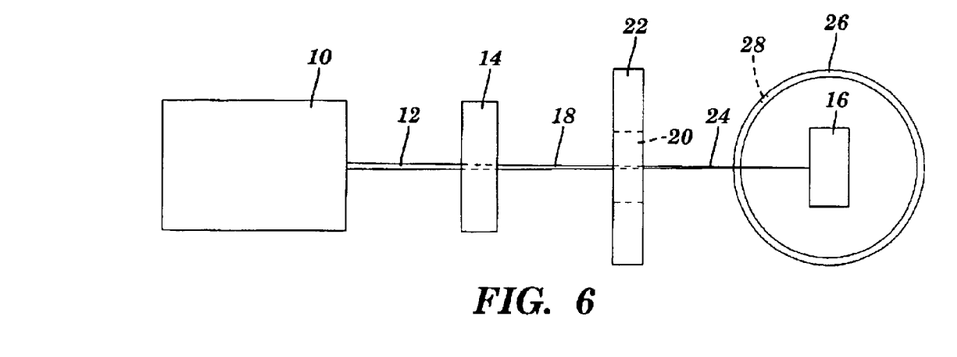
FIG. 6 shows an illustrative top view of the system of FIG. 1 with the slit unit further rotated.

During use, the combined assembly 30 is moved so that the aperture 20 of the aperture unit 22 is positioned at the top of the filtered illumination field 18. The rotating slit unit 26 is then rotated so that the slit 28 passes in front of the portion 24 of the illumination field that is transmitted from the aperture unit 22 as shown in FIGS. 4 and 5. The rotating slit unit then continues rotating as shown in FIG. 6 until it completes a full circle. The sensor unit 16 does not rotate with the slit unit 26, but rather remains in place so that illumination that passes through the slit 28 is received by the sensor unit 16.

Figure 7:
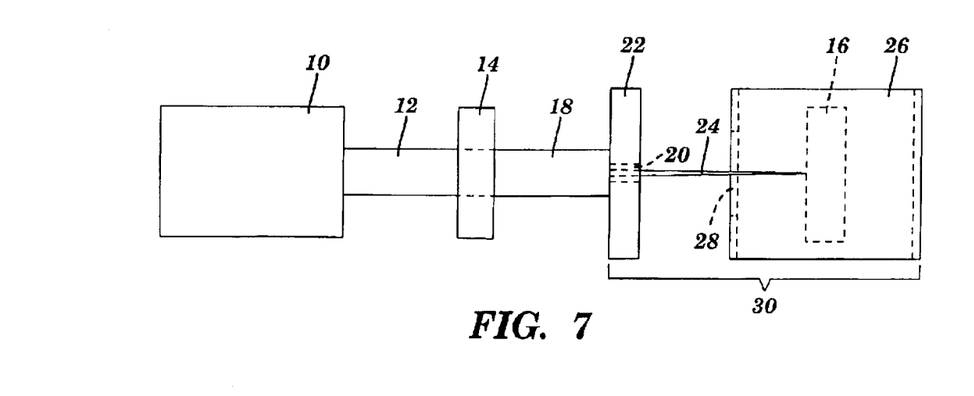
FIG. 7 shows an illustrative side view of the system of FIG. 1 with the aperture unit and slit unit moved downward.

As shown in FIG. 7, the assembly 30 is then moved downward by an incremental step (of for example, 100 microns), and the rotating slit unit is then again rotated through a complete cycle. In this fashion, a complete scan of each portion of the line illumination field is recorded.

Figure 8:
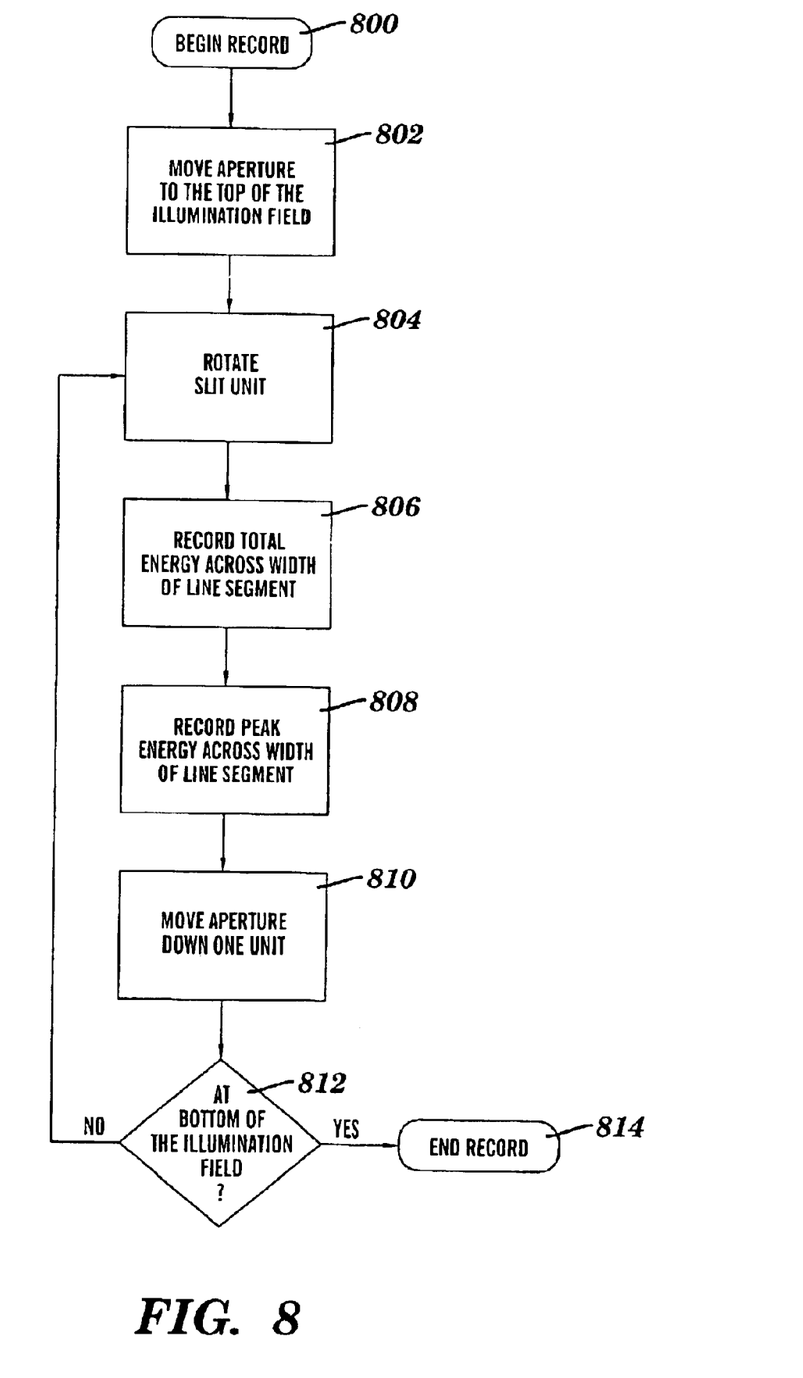
FIG. 8 shows an illustrative flowchart of a method recording data representative of the illumination field of a line of laser illumination in accordance with an embodiment of the invention.

Specifically, and with reference to FIG. 8, the process of recording illumination data (step 800) begins by moving the aperture unit to the top of the illumination field (step 802). The slit unit is then rotated through a complete revolution (step 804). The total energy across the width of the line segment is then recorded (step 806), and the peak energy across the width of the line segment is then recorded (step 808). The aperture unit is then moved down by an incremental step (step 810). If the aperture in the aperture unit is at the bottom of the line illumination field (step 812), then the process ends (step 814), otherwise the process returns to step 804 and a new set of data is recorded for the current line segment.

Figure 9:
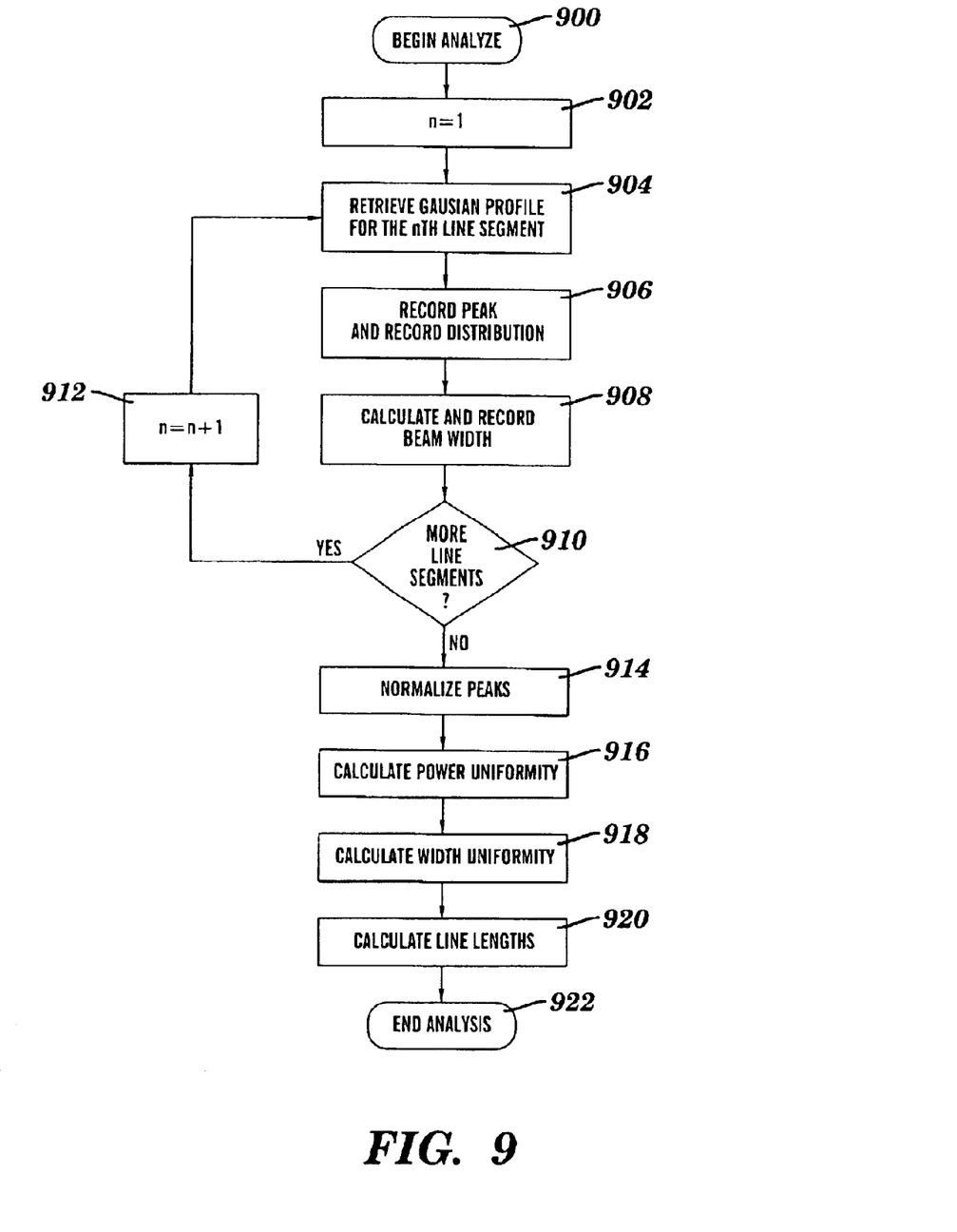
FIG. 9 shows an illustrative flowchart of a method of processing recorded data in accordance with an embodiment of the invention.

As shown in FIG. 9, once the data is recorded for the entire line illumination field, the method of analyzing the data begins (step 900) by setting the line segment variable n equal to one (step 902). The Gausian profile for the $n^{th}$ line segment is then retrieved (step 904), and the peak and distribution for that line segment are recorded (step 906). The beam width is also calculated and recorded (step 908). The above steps 904–908 then repeat fort each line segment until each segment of the laser line is processed. In particular, if there are more line segments to be processed (step 910), then the variable n is set to be increased by one (step 912), and the process returns to step 904.

After all n line segments have been processed, then the process continues from step 910, and the peaks are normalized (step 914). The power uniformity is then calculated (step 916), the width uniformity is then calculated (step 918), and the line length is then calculated (step 920). The process then ends (step 922). The system may then display any of a wide variety of information regarding the illumination field, such as vertical and horizontal profiles, and beam widths and uniformity.

Figure 10:
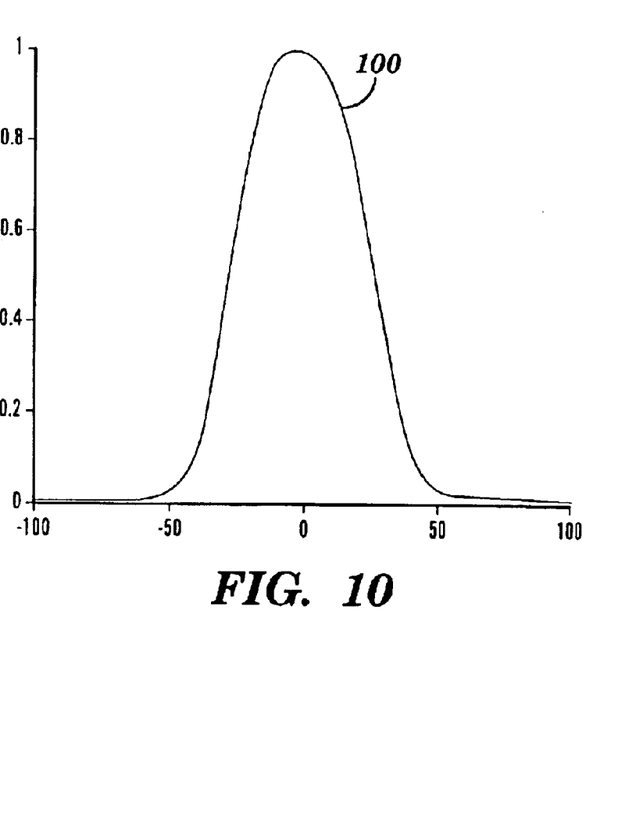
FIG. 10 shows a graphical representation of a horizontal profile of an illumination field that was recorded in accordance with an embodiment of the invention.
Figure 11:
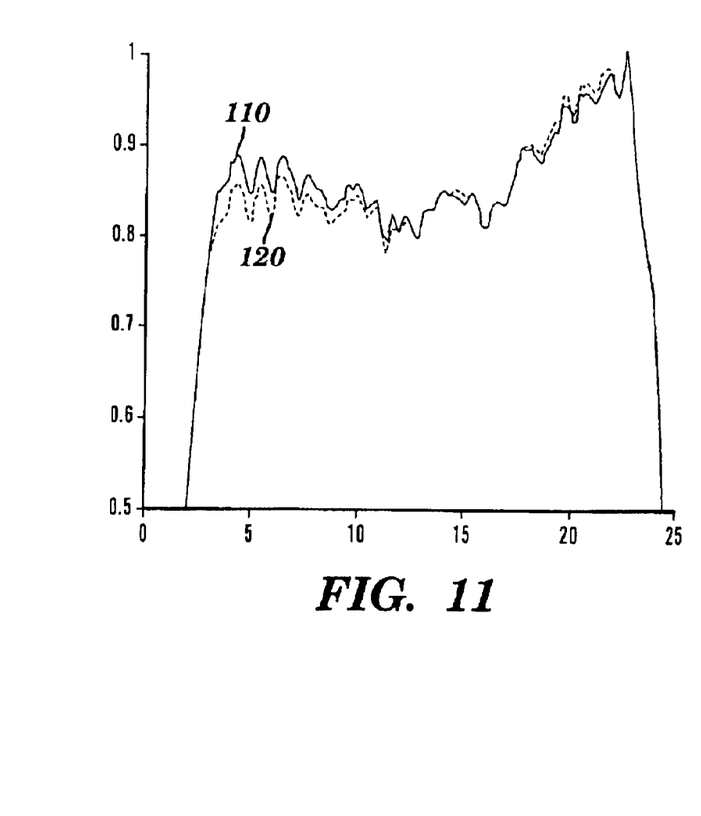
FIG. 11 shows a graphical representation of a vertical profile of the peak energy and total energy of an illumination field that was recorded in accordance with an embodiment of the invention.

As shown in FIG. 10, the composite horizontal profile shows an illustrative graph 100 of the illumination field in which the x-axis is in microns and the y-axis is adjusted to apply the peak energy to a unitary value. As shown in FIG. 11, the vertical profile shows an illustrative graph 110 of the total energy along the illumination line, and shows an illustrative graph 120 of the peak energy along the illumination line. The x-axis of FIG. 11 is shown in mm, and the y-axis is unitary as shown in FIG. 10. As shown in FIG. 11, the difference between the total and peak energy is relatively small, but the uniformity of both the peak and total energies is not less than desirable. The uniformity error, in fact is 20.5% for this sample. The line length is 19.8 mm, and the power within the line is 37 Watts.

Figure 12:
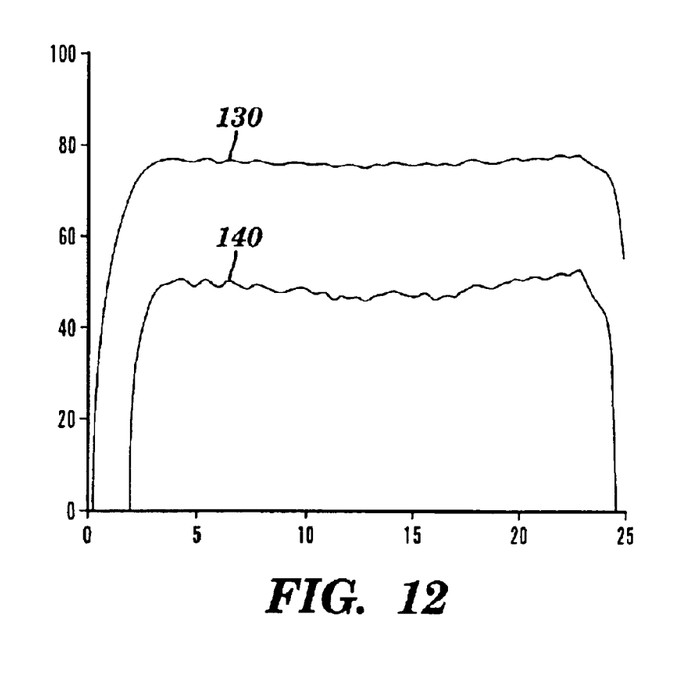
FIG. 12 shows a graphical representation of the fast axis beam width as determined based on each of $1/e^2$ and full-width-half-max for an illumination field that was recorded in accordance with an embodiment of the invention.
Figure 13:
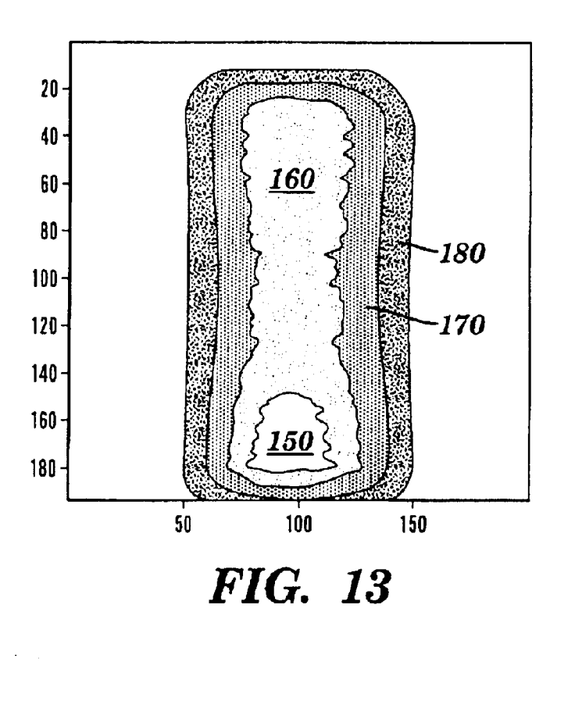
FIG. 13 shows a graphical representation of a profile with energy thresholds of an illumination field that was recorded in accordance with an embodiment of the invention.

As shown in FIG. 12, the fast axis beam width maybe determined based on a limit of $1/e^2$ (or 13.5%) as shown at 130, or may be determined based on full-width-half-max (or FWHM) as shown at 140. The x-axis is shown in mm and the y-axis is shown in um. In the $1/e^2$ graph at 130, the beam width is 78.2 um, and the variation is 4.15%. In the graph FWHM graph 140, the beam width is 53.3 um, and the variation is 14.8%. As shown at FIG. 13, a composite illustration of the illumination line maybe displayed in which the areas of highest energy are shown in area 150, areas of less energy are shown in area 160. Areas of further less energy are shown in area 170, and area 180 has the least amount of energy as determined by setting threshold values at, for example, 13.5, 25, 50, 75 and 90%.

The system, therefore, may be used to identify numerous qualities of the line of laser illumination, including uniformity of total and peak energy, uniformity in spot size, uniformity in focal points, uniformity at threshold levels, and the length and width of the illumination line.

Those skilled in the art will appreciate that numerous modifications and variations may be made to the above disclosed embodiments without departing from the spirit and scope of the present invention.

What is claimed is:

1. A system for analyzing a focused illumination field of a line of laser illumination, said system comprising:
    a first movable unit that includes a first opening through which at least a portion of the illumination field may pass, said first movable unit being adapted for movement in a first direction;
    a sensor unit that is adapted to receive illumination and to produce a sensor output signal representative a characteristic of the illumination field; and
    a second movable unit that includes a second opening through which at least a portion of the illumination field may pass and reach a sensor, said focused illumination field having a desired focal point within said second movable unit, said second movable unit being positioned between said first movable unit and said sensor unit and being adapted for movement between at least a first position in which very little or no light from said illumination field may reach said sensor unit, a second position in which a relatively high amount of light from said illumination field may reach said sensor unit, and a third position in which very little or no light from said illumination field may reach said sensor unit prior to movement of said first movable unit such that energy distribution data may be obtained for individual segments of laser line illumination in said imaging system.

2. A system as claimed in claim 1, wherein said first opening is elongated in shape and is oriented to be orthogonal to the orientation of the line of laser illumination.

3. A system as claimed in claim 1, wherein said second opening is elongated in shape and is oriented to be parallel to the orientation of the line of laser illumination.

4. A system as claimed in claim 1, wherein said first movable unit is adapted to move in a direction that is parallel to the orientation of the line of laser illumination.

5. A system as claimed in claim 1, wherein said second movable unit is adapted to move the second opening across the path of the illumination field in a second direction that is orthogonal to the orientation of the line of laser illumination.

6. A system as claimed in claim 5, wherein said second movable unit is adapted to rotate about a line that is parallel with the line of laser illumination and that crosses the path of the direction of travel of the illumination field.

7. A system as claimed in claim 1, wherein said system also includes a filter for reducing the amount of illumination that reaches said first movable unit.

8. A system as claimed in claim 1, wherein each of said first and second openings is elongated in shape and orthogonally disposed to one another when aligned with the direction of travel of the illumination field.

9. A system as claimed in claim 1, wherein said system monitors the peak and total energy of a plurality of segments of the line of laser illumination.

10. A system as claimed in claim 1, wherein said first opening is positioned at the focal plane of the illumination field.

11. A system for analyzing a focused illumination field of a line of laser illumination, said system comprising:

first means for receiving said illumination field and for blocking a first blocked portion of the illumination field and for a permitting a first passed portion of the illumination field to be transmitted through said first means, said first means being movable between a first position in which said first passed portion of the illumination field may be selected to be one portion of the illumination field line, and a second position in which a second passed portion of the illumination field may be selected to be another portion of the illumination field line;

sensor means for receiving the first passed portion of the illumination field; and second means disposed between said first means and said sensor means, said second means for blocking the first passed portion of the illumination field, for subsequently receiving the first passed portion of the illumination field having a desired focal point within said second means, and for subsequently blocking the first passed portion of the illumination field from reaching said sensor means or permitting a second portion of the illumination field to reach said sensor means when said first means is moved from said first position to said second position.

12. A system as claimed in claim 11, wherein said first means includes a first elongated opening that is orthogonal to the orientation of the line of laser illumination.

13. A system as claimed in claim 12, wherein said first opening may be moved in a direction that is parallel to the orientation of the line of laser illumination.

14. A system as claimed in claim 11 wherein said second means includes a second elongated opening that is parallel to the orientation of the line of laser illumination.

15. A system as claimed in claim 14, wherein said second opening may be moved across the path of the field of laser illumination in a direction that is orthogonal to the orientation of the line of laser illumination.

16. A system as claimed in claim 11, wherein said first means includes a first elongated opening and said second means includes a second elongated opening that is orthogonal to the orientation of said first elongated opening.

17. A system for analyzing an illumination field of a line of laser illumination that is oriented in a first direction and travels along an illumination path in a second direction, said system comprising:

a first movable unit that includes a first elongated opening through which at least a portion of the illumination field may pass, said first elongated opening being orthogonal to the first direction, and said first movable unit being adapted for movement in a direction that crosses the illumination path and is parallel to the first direction;

a sensor unit that is adapted to receive illumination and to produce a sensor output signal representative a characteristic of the illumination field; and a second movable unit that includes a second elongated opening through which at least a portion of the illumination field may pass, said second elongated opening being parallel to the first direction, and said second movable unit being positioned between said first movable unit and said sensor unit and being adapted for movement in a direction that crosses the illumination path in a direction that is orthogonal to the first direction.

18. A system for analyzing an illumination field of a line of laser illumination, said system comprising:

a first movable unit that includes a first opening through which at least a portion of the illumination field may pass, said first movable unit being adapted for movement in a first direction that is parallel to the orientation of the line of laser illumination;

a sensor unit that is adapted to receive illumination and to produce a sensor output signal representative a characteristic of the illumination field; and a second movable unit that includes a second opening through which at least a portion of the illumination field may pass, said second movable unit being positioned between said first movable unit and said sensor unit and being adapted for movement between at least a first position in which very little or no light from said illumination field may reach said sensor unit, and a second position in which a relatively high amount of light from said illumination field may reach said sensor unit.

19. A system for analyzing an illumination field of a line of laser illumination, said system comprising:

a first movable unit that includes a first opening through which at least a portion of the illumination field may pass, said first movable unit being adapted for movement in a first direction;

a sensor unit that is adapted to receive illumination and to produce a sensor output signal representative a characteristic of the illumination field; and a second movable unit that includes a second opening through which at least a portion of the illumination field may pass, said second movable unit being positioned between said first movable unit and said sensor unit and being adapted for movement between at least a first position in which very little or no light from said illumination field may reach said sensor unit, and a second position in which a relatively high amount of light from said illumination field may reach said sensor unit, said second movable unit being adapted to move the second opening across the path of the illumination field in a second direction that is orthogonal to the orientation of the line of laser illumination, and is adapted to rotate about a line that is parallel with the line of laser illumination and that crosses the path of the direction of travel of the illumination field.

20. A system for analyzing an illumination field of a line of laser illumination, said system comprising:

a first movable unit that includes a first opening that is positioned at a focal plane of the illumination field and through which at least a portion of the illumination field may pass, said first movable unit being adapted for movement in a first direction;

a sensor unit that is adapted to receive illumination and to produce a sensor output signal representative a characteristic of the illumination field; and a second movable unit that includes a second opening through which at least a portion of the illumination field may pass, said second movable unit being positioned between said first movable unit and said sensor unit and being adapted for movement between at least a first position in which very little or no light from said illumination field may reach said sensor unit, and a second position in which a relatively high amount of light from said illumination field may reach said sensor unit.

21. A system for analyzing an illumination field of a line of laser illumination, said system comprising:

first means including a first elongated opening that is orthogonal to the orientation of the line of laser illumination for receiving said illumination field and for blocking a first portion of the illumination field and for a permitting a second portion of the illumination field to be transmitted through said first means, said first means being movable between a first position in which said second portion of the illumination field may be selected to be one end of the illumination field line, and a second position in which said second portion of the illumination field may be selected to be the other end of the illumination field line, said first opening being movable in a direction that is parallel to the orientation of the line of laser illumination;

sensor means for receiving the second portion of the illumination field; and second means disposed between said first means and said sensor means, said second means for receiving the second portion of the illumination field, and for selectively blocking the second portion of the illumination field from reaching said sensor means or permitting the second portion of the illumination field to reach said sensor means.

* * * * *